US012596096B2

(12) United States Patent
Wells et al.

(10) Patent No.: US 12,596,096 B2
(45) Date of Patent: Apr. 7, 2026

(54) ELECTROCHEMICAL CELL CHARACTERISATION

(71) Applicant: Cirrus Logic International Semiconductor Ltd., Edinburgh (GB)

(72) Inventors: James Wells, Edinburgh (GB); Gagan Midha, Edinburgh (GB); Gordon J. Bates, Edinburgh (GB); Sunil Saunders, Oxford (GB)

(73) Assignee: Cirrus Logic Inc., Austin, TX (US)

( * ) Notice: Subject to any disclaimer, the term of this patent is extended or adjusted under 35 U.S.C. 154(b) by 255 days.

(21) Appl. No.: 18/594,434

(22) Filed: Mar. 4, 2024

(65) Prior Publication Data

US 2024/0302322 A1      Sep. 12, 2024

Related U.S. Application Data

(60) Provisional application No. 63/450,750, filed on Mar. 8, 2023.

(51) Int. Cl.
*G01N 27/30*      (2006.01)
*G01N 27/416*      (2006.01)

(52) U.S. Cl.
CPC ................................. *G01N 27/4163* (2013.01)

(58) Field of Classification Search
CPC .................................................. G01N 27/4163
See application file for complete search history.

(56) References Cited

U.S. PATENT DOCUMENTS 7,413,645 B2 *   8/2008   Scheffler ............ G01N 33/0006
205/780.5

* cited by examiner

*Primary Examiner* — Alesa Allgood
(74) *Attorney, Agent, or Firm* — Jackson Walker L.L.P.

(57) ABSTRACT

Circuitry for processing a response from an electrochemical cell to a stimulus, the circuitry comprising: sense circuitry configured to measure the response of the electrochemical cell to the stimulus; and processing circuitry configured to: sample the measured response to obtain a plurality of samples; and output the plurality of samples, wherein the processing circuitry is operable in: a continuous sampling mode in which the processing circuitry is configured to periodically sample the measured response at a fixed sampling rate; a discontinuous sampling mode in which the processing circuitry is configured to periodically sample the measured response during macro periods separated by macro intervals during which sampling of the measured response is disabled.

24 Claims, 10 Drawing Sheets

S = sampling
D = disabled

S/s = sampling
D/d = disabled

ELECTROCHEMICAL CELL CHARACTERISATION

The present disclosure claims priority to U.S. Provisional Patent Application Ser. No. 63/450,750, filed Mar. 8, 2023, which is incorporated by reference herein in its entirety.

TECHNICAL FIELD

The present disclosure relates to circuitry for measuring characteristics in electrochemical sensors.

BACKGROUND

Electrochemical sensors are widely used for the detection or characterisation of one or more particular chemical species, analytes, as an oxidation or reduction current (or voltage in the case of potentiometric sensors). Such sensors comprise an electrochemical cell, consisting of two or more electrodes configured for contact with an analyte whose concentration is to be ascertained. Such sensors also comprise circuitry for driving one or more of the electrodes and for sampling a response signal at one or more of the electrodes. The sampled response signal can be processed to determine a concentration of an analyte.

When such circuitry is battery powered, for example when an electrochemical sensor is integrated into a wearable device, it is desirable for the sensor to be as small as possible and use as little power as possible. Power consumption can be reduced by reducing the sampling frequency of the electrochemical cell. However, reducing sampling frequency can lead to measurement inaccuracies and reductions in signal-to-noise ratio (SNR).

SUMMARY

According to a first aspect of the disclosure, there is provided Circuitry for processing a response from an electrochemical cell to a stimulus, the circuitry comprising: sense circuitry configured to measure the response of the electrochemical cell to the stimulus; and processing circuitry configured to: sample the measured response to obtain a plurality of samples; and output the plurality of samples, wherein the processing circuitry is operable in: a continuous sampling mode in which the processing circuitry is configured to periodically sample the measured response at a fixed sampling rate; a discontinuous sampling mode in which the processing circuitry is configured to periodically sample the measured response during macro periods separated by macro intervals during which sampling of the measured response is disabled.

The number of samples obtained during each macro period may be one or more than one.

During each macro period, the processing circuitry may be configured to periodically sample the measured response during micro periods separated by micro intervals in which sampling of the measured response is disabled.

The number of samples obtained during each micro period may be one or more than one.

The processing circuitry may be continuously enabled in the continuous sampling mode.

The processing circuitry may be configured to adapt sampling of the measured response over time. Adapting sampling of the measured response comprises one or more of the following: a. switching between the continuous sampling mode and the discontinuous sampling mode; b. adjusting a number of samples obtained during the macro period;

c. adjusting a duration of the macro period; d. adjusting a duration of the macro interval.

Adapting sampling of the measured response may comprise stochastically sampling the measured response. Stochastic sampling may comprise randomizing a duration of each of the macro intervals. Such randomization may be pseudorandom. Alternatively, stochastic sampling may be achieved by varying the duration of successive macro intervals in a sufficiently disordered manner so as to be stochastic or near-stochastic.

The processing circuitry may be configured to adapt sampling in dependence on a performance metric associated with the circuitry. For example, the performance metric may comprise one or more of the following: a. a noise level in the sense circuitry or the processing circuitry; b. a level of aliasing in the plurality of samples. The noise level may be Gaussian, impulsive, or both Gaussian and impulsive noise levels may be taken into account.

The processing circuitry may be configured to adapt sampling of the measured response in dependence on a power characteristic of the circuitry. For example, the power characteristic may comprise a battery power level of a battery providing power to the circuitry. The processing circuitry may be configured to adapt sampling of the measured response to consume less power in response to the power characteristic falling below a power threshold.

The processing circuitry may be configured to adapt sampling of the measured response in dependence on an analyte of interest present in the electrochemical cell. The analyte comprise one of glucose, ketones, and lactate.

The processing circuitry may be configured to adapt sampling of the measured response in dependence on a determined analyte concentration in the electrochemical cell. For example, the processing circuitry may be configured to: determine the analyte concentration; compare the analyte concentration to one or more analyte thresholds; and adapt the sampling based on the comparison.

The analyte may be glucose. An overall sampling rate of sampling by the processing circuitry may be increased in response to determining that the analyte concentration falls outside of a predetermined range, such as a glucose concentration falling outside of a predetermined range.

The processing circuitry may comprise a first analog-to-digital converter (ADC) configured to perform the sampling.

The electrochemical cell may comprise a first electrode and a second electrode. The sense circuitry may be configured to measure the response of the electrochemical cell to the stimulus at a first electrode, and to measure a second response of the electrochemical cell to the stimulus at a second electrode. The processing circuitry may comprise an additional ADC configured to sample the measured second response to obtain an additional plurality of samples.

The processing circuitry may be configured to control sampling by the ADC and the additional ADC. Controlling sampling by the ADC and the additional ADC may comprise staggering sampling of the ADC and the additional ADC. Controlling sampling by the ADC and the additional ADC may comprise synchronising sampling by the ADC and the additional ADC.

The measured response may be obtained from a first electrode of the electrochemical cell, wherein during the macro intervals, one or more components of the processing circuitry are configured to process one or more additional signals. The one or more additional signals comprises one of: an additional measured response obtained from a second electrode of the electrochemical cell; a signal obtained from a battery, the battery powering the circuitry.

The circuitry may further comprise drive circuitry configured to apply the stimulus to the electrochemical cell. The drive circuitry may comprise a digital-to-analog converter configured to generate the stimulus responsive to a digital input signal.

The electrochemical cell may comprise one of an amperometric sensor, a potentiometric sensor and a battery.

According to another aspect of the disclosure, there is provided circuitry for processing a response from an electrochemical cell to a stimulus, the circuitry comprising: sense circuitry configured to measure the response of the electrochemical cell to the stimulus; and processing circuitry configured to: sample the measured response to obtain a plurality of samples; and output the plurality of samples, wherein the processing circuitry is configured to sample the measured response during macro periods interleaved by macro intervals during which sampling of the measured response is disabled, wherein the duration of successive macro intervals is varied whilst maintaining a substantially constant sampling rate over time.

The duration of each macro interval may be pseudo-randomly generated.

According to another aspect of the disclosure, there is provided an integrated circuit (IC), comprising the circuitry described above.

According to another aspect of the disclosure, there is provided a system comprising: the circuitry described above; and the electrochemical cell.

According to another aspect of the disclosure, there is provided an electronic device, comprising the circuitry, the IC, or the system described above.

The device may comprise one of an analyte monitoring device, an analyte sensing device, a battery, a battery monitoring device, a mobile computing device, a laptop computer, a tablet computer, a games console, a remote control device, a home automation controller or a domestic appliance, a toy, a robot, an audio player, a video player, or a mobile telephone, and a smartphone.

According to another aspect of the disclosure, there is provided a method of processing a response from an electrochemical cell to a stimulus, the method comprising: measuring the response of the electrochemical cell to the stimulus; and sampling the measured response to obtain a plurality of samples; and outputting the plurality of samples; wherein sampling of the measured response is performed in: a continuous sampling mode in which the measured response is sampled periodically at a fixed sampling rate; and a discontinuous sampling mode in which the measured response is sampled periodically during macro periods separated by macro intervals during which sampling of the measured response is disabled.

According to another aspect of the disclosure, there is provided a method of processing a response from an electrochemical cell to a stimulus, the method comprising: measuring the response of the electrochemical cell to the stimulus; and sampling the measured response to obtain a plurality of samples; and outputting the plurality of samples, wherein the measured response is sampled during sampling periods interleaved by non-sampling intervals during which sampling of the measured response is disabled, wherein the duration of successive non-sampling intervals is varied whilst maintaining a substantially constant sampling rate over time.

Throughout this specification the word "comprise", or variations such as "comprises" or "comprising", will be understood to imply the inclusion of a stated element, integer or step, or group of elements, integers, or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

Electrochemical sensors are widely used for the detection of one or more particular chemical species, analytes, as an oxidation or reduction current. Such sensors comprise an electrochemical cell, consisting of two or more electrodes configured for contact with an analyte whose concentration is to be ascertained. Such sensors also comprise circuitry for driving one or more of the electrodes and for measuring a response at one or more of the electrodes. Batteries also comprise one or more electrochemical cells which typically consist of two or more electrodes (e.g., an anode and a cathode) configured for contact with a conductive electrolyte. Characteristics of batteries may be ascertained using drive and measurement circuitry similar to that used for characterising electrochemical cells in electrochemical sensors.

Measurements made by measurement circuitry used to characterise electrochemical cells are typically sampled using an analog-to-digital converter (ADC) or similar. In doing so, a trade-off is made between power consumption and quality of measurements obtained. For example, increasing a time period between samples may reduce power consumption to the detriment of quality of signals obtained.

Embodiments of the present disclosure provide novel circuitry for processing electrochemical cells and systems (such as sensors, batteries, and the like) into which electrochemical cells are incorporated. Specifically, embodiments of the present disclosure relate to novel sampling techniques to enable adaptation of trade-off between signal quality and power consumption.

Figure 1:
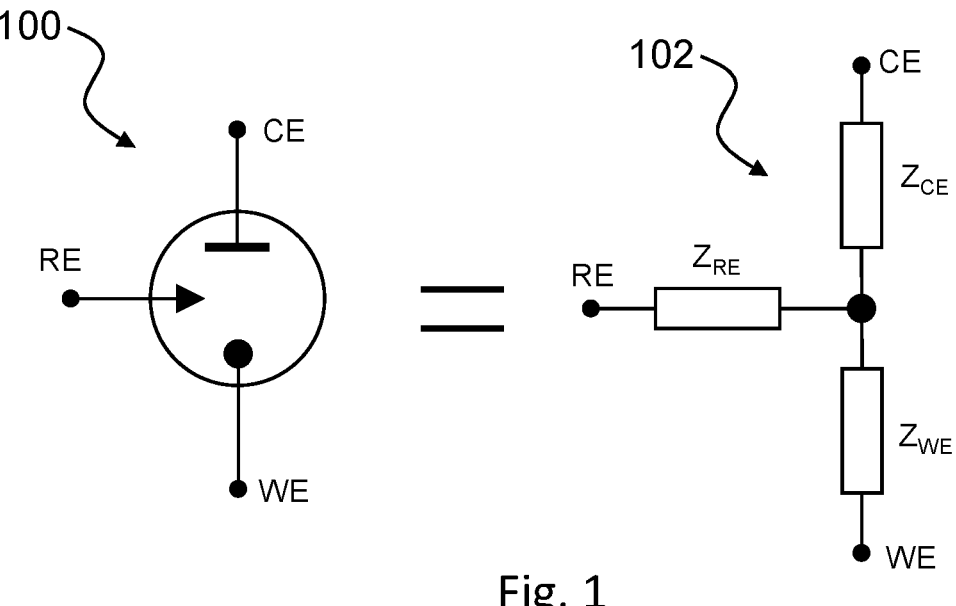
FIG. 1 illustrates a schematic diagram and electrical equivalent circuit for a three-electrode electrochemical cell.

FIG. 1 is a schematic diagram of an example electrochemical cell 100 comprising three electrodes, namely a counter electrode CE, a working electrode WE and a reference electrode RE. FIG. 1 also shows an equivalent circuit 102 for the electrochemical cell 100 comprising a counter electrode impedance ZCE, a working electrode impedance ZWE and a reference electrode impedance ZRE.

Figure 2:
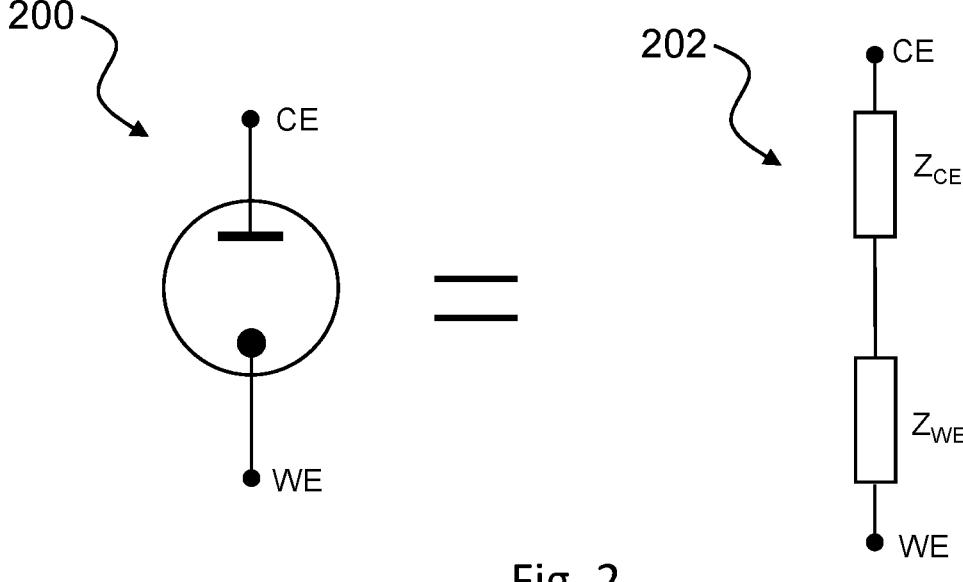
FIG. 2 illustrates a schematic diagram and electrical equivalent circuit for a two-electrode electrochemical cell.

FIG. 2 is a schematic diagram of another example electrochemical cell 200 comprising two electrodes, namely a counter electrode CE and a working electrode WE. The electrochemical cell 200 varies for the cell 100 with the omission of the reference electrode RE. FIG. 2 also shows an equivalent circuit 102 for the electrochemical cell 200 comprising a counter electrode impedance ZCE and a working electrode impedance ZWE.

In some embodiments, the working electrode WE comprises an assay or chemical of interest. For example for the analysis of glucose as an analyte, the working electrode may comprise a layer of glucose oxidase. The counter electrode CE is provided to form an electrical or ohmic connection with the working electrode WE. Optionally, the reference electrode is provided, which is typically a sensing point between the working electrode WE and the counter electrode CE, allowing independent measurement of the potential associated with each of the working and counter electrodes WE, CE, rather than just measuring a potential difference between the counter and working electrodes CE, WE.

Embodiments of the disclosure will be described with reference to these example electrochemical cells 100, 200. It will be appreciated, however, that the techniques and apparatus described herein may be used in conjunction with any conceivable electrochemical system, including but not limited to electrochemical cells comprising at least two electrodes (e.g. a counter electrode CE, a working electrode WE and optionally a reference electrode RE), or electrochemical cells with more than three electrodes (e.g. two or more counter electrodes and/or two or more working electrodes). Electrodes of the electrochemical cells described herein may also be referred to as anodes and/or cathodes as is conventional in the field of electrical batteries.

To determine a characteristic of either of the electrochemical cells 100, 200, and therefore an analyte concentration, it is conventional to apply a bias voltage at the counter electrode CE and measure a current at the working electrode WE. When provided, the reference electrode RE may be used to measure a voltage drop between the working electrode WE and the reference electrode RE. The bias voltage is then adjusted to maintain the voltage drop between the reference and working electrodes RE, WE constant. As the resistance in the cell 100 increases, the current measured at the working electrode WE decreases. Likewise, as the resistance in the cell 100 decreases, the current measured at the working electrode WE increases. Thus the electrochemical cell 100 reaches a state of equilibrium where the voltage drop between the reference electrode RE and the working electrode WE is maintained constant. Since the bias voltage at the counter electrode CE and the measured current at WE are known, the resistance of the cell 100 can be ascertained.

Figure 3A:
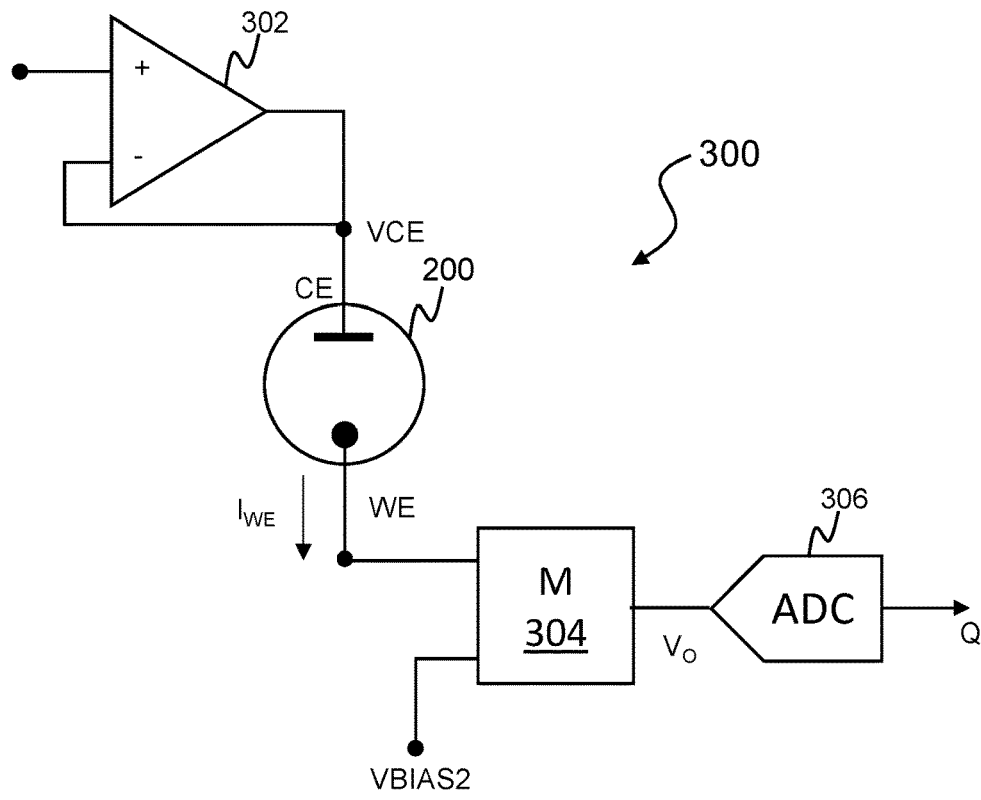
FIG. 3A is a schematic diagram of an example prior art measurement circuit.

FIG. 3A illustrates an example known drive and measurement circuit 300 which is configured to implement the above explained cell characterisation, specifically for measuring an analyte concentration in the electrochemical cell 200 shown in FIG. 2. The circuit 300 comprises a first amplifier 302 and a measurement circuit 304. Each of the first amplifier 302 and the measurement circuit 304 may comprise one or more op-amps. A non-inverting input of the first amplifier 302 is coupled to a bias voltage VBIAS1 which may be generated by a digital-to-analog converter DAC (not shown). An inverting input of the first amplifier 302 is coupled to the counter electrode CE. An output of the first amplifier 302 is coupled to the counter electrode CE and configured to drive the counter electrode CE with a counter electrode bias voltage VCE. The counter electrode bias voltage VCE applied at the counter electrode CE by the first amplifier 302 is proportional to the difference between the bias voltage VBIAS1 and the voltage at the counter electrode CE.

The measurement circuit 304 is coupled between the working electrode WE and an analog-to-digital converter (ADC) 306. The measurement circuit 304 is operable to output to the ADC 306 a signal proportional to the current flowing from the working electrode WE. The ADC 306 then converts the signal output from the measurement circuit 304 to a digital output signal Q which represents the current flowing from the working electrode WE.

The measurement circuit 304 is typically implemented as a transimpedance amplifier or a current conveyor.

Figure 3B:
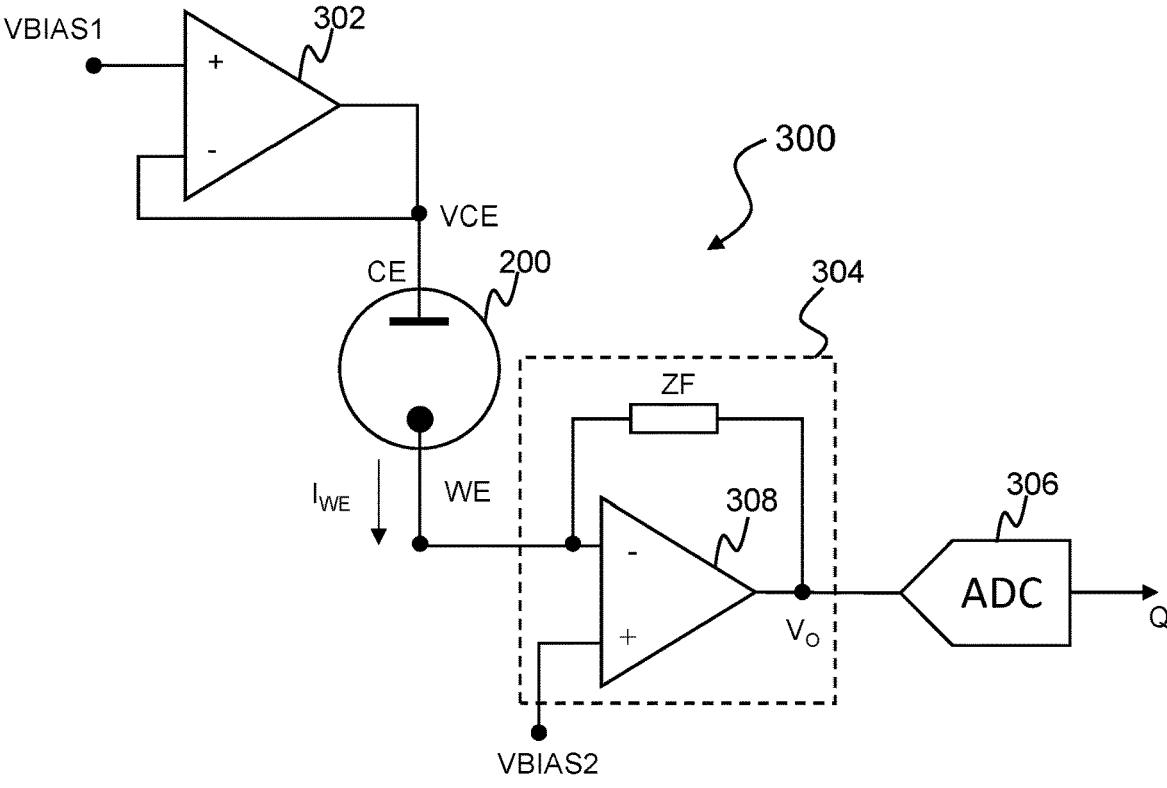
FIG. 3B is a schematic diagram of an example prior art measurement circuit.

FIG. 3B illustrates an example implementation of the drive and measurement circuit 300, the measurement circuit 304 implemented as a transimpedance amplifier comprising a second amplifier 308. An inverting input of the second amplifier 308 is coupled to the working electrode WE and a non-inverting input of the second amplifier 308 is coupled to a fixed bias voltage VBIAS2, for example ground GND. A feedback impedance ZF is coupled between the non-inverting input and an output of the second amplifier 308. As such, the second amplifier 308 operates as a transimpedance amplifier. The second amplifier 308 is thus operable to output a voltage VO which is proportional to the current IWE at the working electrode WE. The output voltage VO is then provided to the analog-to-digital converter (ADC) 306 which outputs a digital output Q which represents the current IWE at the working electrode WE.

To bias the counter electrode CE, and therefore the electrochemical cell 200, at different voltages, the bias voltage VBIAS1 provided to the first amplifier 302 may be adjusted. The bias voltage VBIAS1 may be adjusted between a reference voltage (e.g. ground or zero volts) and the supply voltage VDD. With the non-inverting input of the second amplifier 204 is set at VDD/2, a positive bias may be applied to the cell 200 by maintaining the bias voltage VBIAS above VDD/2. Likewise, a negative bias may be applied to the cell 100 by maintaining the bias voltage VBIAS below VDD/2.

In the example shown in FIG. 3B, the cell 200 is in the form of an amperometric sensor. As such, the stimulus applied to the cell 200 is a voltage stimulus and the measured response is a current. In other embodiments, a potentiometric sensor or battery may be characterised by applying a current stimulus and measuring a voltage response of the cell(s) comprised in the sensor or battery. In either case, an ADC, such as the ADC 306, is provided which samples an output signal to generate a digital output Q comprising a plurality of samples of the output signal.

It is common for electrochemical cells, such as the cells 100, 200 shown in FIGS. 1 and 2, to be used in power sensitive devices, such as those powered by batteries (e.g. wearable (e.g. medical) devices). In such devices, it is desirable to minimise power consumption. One way to reduce power consumption is to reduce the frequency of sampling of the electrochemical cell 100. It will be appreciated, however, that reducing the frequency of sampling of the cell can impact the accuracy of measurements and/or increase latency which may lead to loss of information regarding characteristics of the cell over time. In some situations, loss of accuracy and/or information may not be critical to operation of the overall system. In other situations, accuracy and/or information detail may be paramount to successful operation. As such, it is desirable to provide a system in which the timing of sampling can be adapted, trading performance for power efficiency and vice versa.

Embodiments of the present disclosure aim to address or at least ameliorate one or more of the above issues by providing data sampling and conversion circuitry having one or more configurable duty cycles for the trade-off of power consumption vs performance. Such duty cycles may relate to on-time (enabled) and off-time (disabled or powered down) of sampling and/or conversion circuitry. Additionally or alternatively, such duty cycles may relate to a time during which such sampling and/or conversion circuitry is sampling/processing data. Circuitry described herein for processing signals obtained from electrochemical cells and the like may comprise one or more analog-to-digital converters (ADCs) configured to sample measurements obtained from an electrochemical cell. In such cases, duty cycling may refer to switching such ADCs between enabled and disabled states. When enabled, such ADCs may be configured to sample measured outputs from an electrochemical cell whilst using power. When disabled, such ADCs may be in a low power state in which power consumption is significantly reduced when compared to when enabled.

Thus, the embodiments of the present disclosure provide configurable processing circuitry which can be operated in both continuous and discontinuous sampling modes. In a discontinuous sampling mode, sampling at a particular node of the cell can be periodically paused or disabled for a period of time. During such non-sampling intervals (in which sampling of that node of the cell is disabled), power consumption is reduced compared to when sampling. In addition, by providing non-sampling intervals in which sampling of that node of the cell is disabled enables idle circuitry components (such as ADCs and filters) to be reassigned to other tasks during such intervals. For example, where an ADC is provided for sampling measurements at a first electrode of a cell, that ADC can be assigned to sample other signals, such as signals obtained from a second electrode of the cell, or signals obtained from another cell. By time domain multiplexing resource in this manner, systems can be implemented with fewer components, which may lead to reduced overall circuit area and power consumption.

Figure 4:
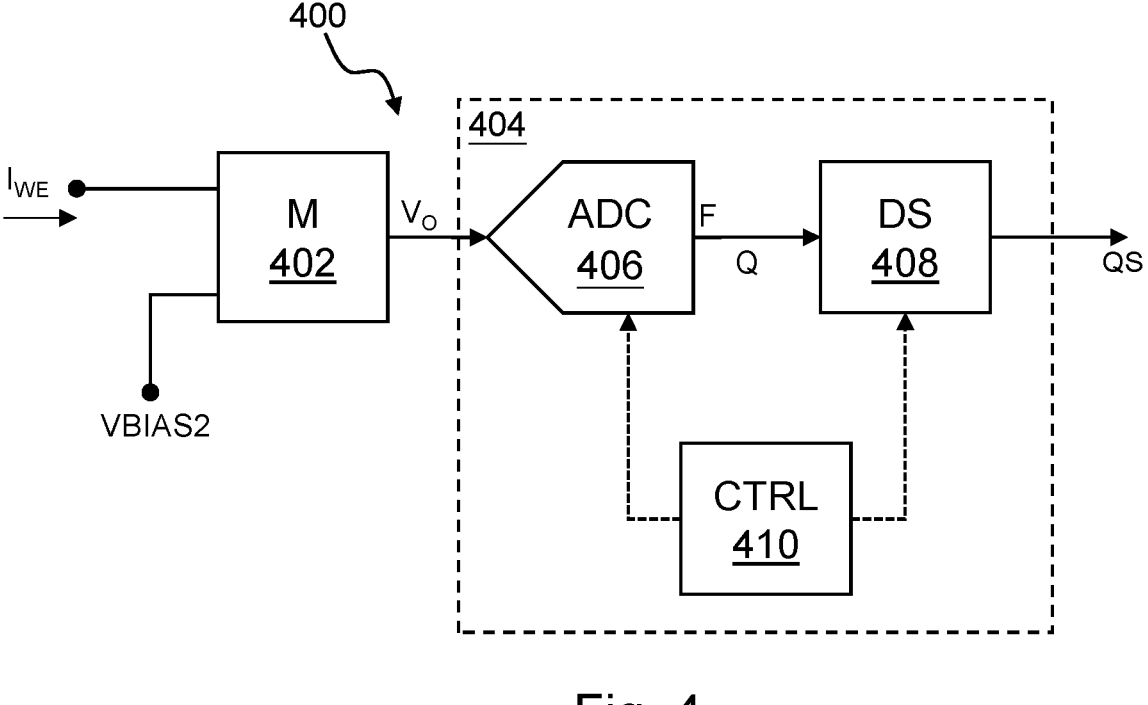
FIG. 4 is a schematic diagram of an example adaptive processing system.

FIG. 4 is a schematic illustration of an adaptive processing system 400 for processing a signal, in this case a working electrode current IWE, obtained from the electrochemical cell 200. The system 400 comprises a measurement circuit 402 and processing circuitry 404. The processing circuitry 404 comprises an ADC 406, downsampling circuitry 408 and control circuitry 410.

The measurement circuit 402 may be similar to the measurement circuit 304 described above with reference to FIG. 3A. For example, the measurement circuit 402 may be implemented as a TIA or a current conveyor. In this example, the measurement circuit 402 is configured to receive a working electrode current IWE from the cell 200 and output a voltage VO proportional to the working electrode current IWE. It will be appreciated that the signal received by the measurement circuit 402 may be in the form of a voltage or current and the signal output from the measurement circuit 402 may be a voltage or current without departing from the scope of the present disclosure. For example, in the case of potentiometric sensing, the signal to be measured is voltage, and so the measurement circuit 402 may be configured to measure a voltage.

The processing circuitry 404 is configured to sample the voltage VO output from the measurement circuit 402 and output an adaptively downsampled output signal QS which is representative of the voltage VO provided to the processing circuitry 404.

The voltage VO from the measurement circuit 402 is provided as an input to the ADC 406, which is configured to sample the output voltage VO at an ADC sampling rate F to output a digital output signal Q at the ADC sampling rate F. In one example, the ADC 406 operates at a sampling rate F of 32.768 kHz. The ADC 406 may be enabled or disabled by the control circuitry 410. Disabling the ADC 406 may comprise shutting down the ADC 406, disconnecting power to the ADC 406, or placing the ADC 406 into a low-power mode. Enabling the ADC 406 may comprise starting up the ADC 406, providing power to the ADC 406 or placing the ADC 406 in a high-power mode.

The digital output signal Q from the ADC 406 is provided to an input of the downsampling circuitry 408.

The downsampling circuitry 408 is configured to downsample or decimate the digital output signal Q to obtain the downsampled output signal QS. Downsampling may be achieved by the downsampling circuitry 408 by a combination of decimation and averaging as is known in the art. For example, the digital output signal Q may first be decimated and then filtered using one or more averaging filters to further downsample the decimated version of the digital output signal. A non-limiting example implementation of the downsampling circuitry 408 is described below with reference to FIG. 12.

Operation of the downsampling circuitry 408 may be controlled by the control circuitry 410. For example, in response to one or more control signals from the control circuitry 410, the downsampling circuitry 408 may adjust the amount of downsampling and/or averaging applied to the digital output signal Q from the ADC 406.

Thus, the control circuitry 410 may be configured to control operation of the signal chain between the input of the ADC 406 and the output of downsampling circuitry 408. Such control is provided to implement various sampling regimes.

Specifically, the processing circuitry 404 may be operable in a plurality of sampling modes to implement the various sampling regimes. It will be appreciated that the specific implementation of the processing circuitry 404 may vary, provided the necessary functionality is provided, as will be described with reference to FIGS. 5 to 9.

FIGS. 5 to 9 provide a non-exhaustive selection of example sampling modes. In the broadest sense, the processing circuitry 404 may be operable in one of two modes; a continuous sampling mode, and a discontinuous sampling mode. Each of these two modes may be further characterised by various parameters which may optionally be adjustable or adaptable. Such adaptation may be based on one or more metrics, such as a power metric associated with the circuitry, a power characteristic of the circuitry, and an analyte metric associated with the analyte of interest.

Figure 5:
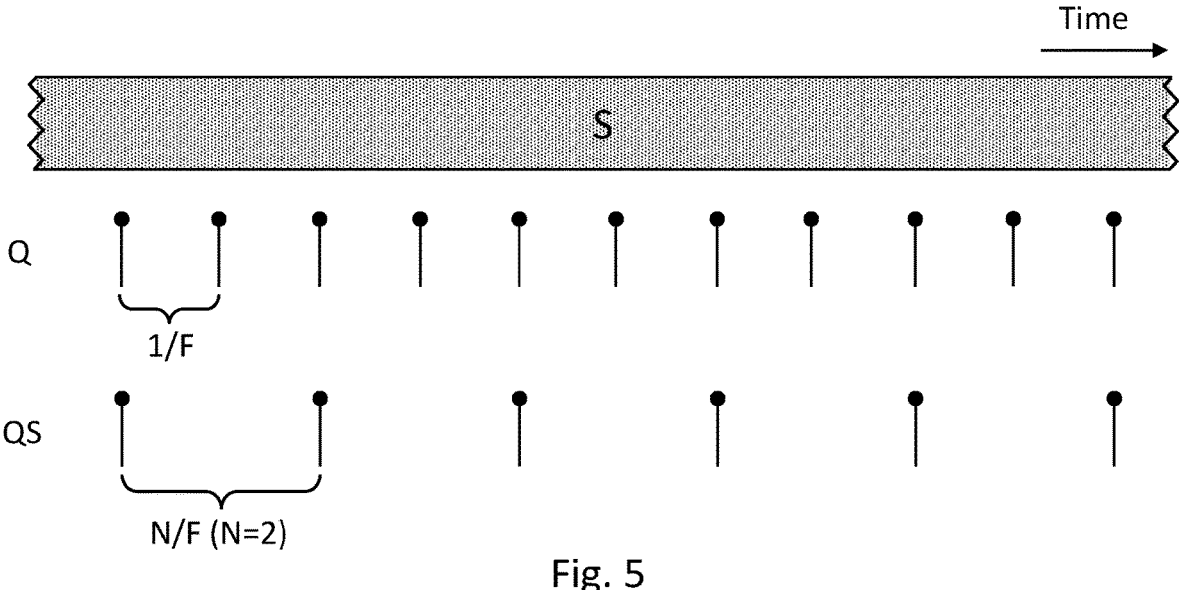
FIG. 5 is a timing diagram of a continuous sampling regime.

FIG. 5 is a timing diagram for a period of operation of the processing circuitry 404 in the continuous sampling mode. When the processing circuitry 404 is in this mode, the control circuitry 410 may control the ADC 406 to be permanently enabled such that the ADC 406 continuously outputs samples at an ADC sampling rate F. The downsampling circuitry 408 may be controlled by the control circuitry 410 to downsample the digital output signal Q by a factor N. In the example shown, N=2 such that the downsampling circuitry 408 outputs as the downsampled output signal QS a continuous stream of samples at a downsampled rate of F/2.

It will be appreciated that in the continuous sampling mode, the downsampling factor N may be more than two. Alternatively, the downsampling factor N may be 1. This may be applicable where the sampling rate F of the ADC 406 does not require downsampling. Where the downsampling factor N is 1, the downsampling circuitry 408 may be omitted altogether, the output of the ADC 406 provided as the downsampled digital output signal QS. Alternatively, the downsampling circuitry 408 may be configured to output the digital output signal Q as the downsampled digital output signal QS, for example by bypassing certain components of the downsampling circuitry 408.

In the continuous mode, the control circuitry 410 may be configured to control the downsampling circuitry 408 to adapt the downsampling factor N. For example, increasing the downsampling factor N may smooth short term error/noise in the downsampled digital output signal QS.

Operating the processing circuitry 404 in the continuous mode may provide a more accurate estimate of the working electrode current when compared to discontinuous operation, due to the voltage VO being sampled continuously. However, such accuracy comes at a power cost since the ADC 406 is permanently enabled and assigned to sampling of the voltage VO and is thus continuously draining power. In addition, with the processing circuitry permanently assigned to sampling the voltage VO, such processing circuitry is not available for other tasks, such as sampling and/or processing other signals.

Thus, to reduce power consumption and optionally provide additional processing capacity, the processing circuitry 404 may operate in (or transition into) the discontinuous sampling mode.

Figure 6:
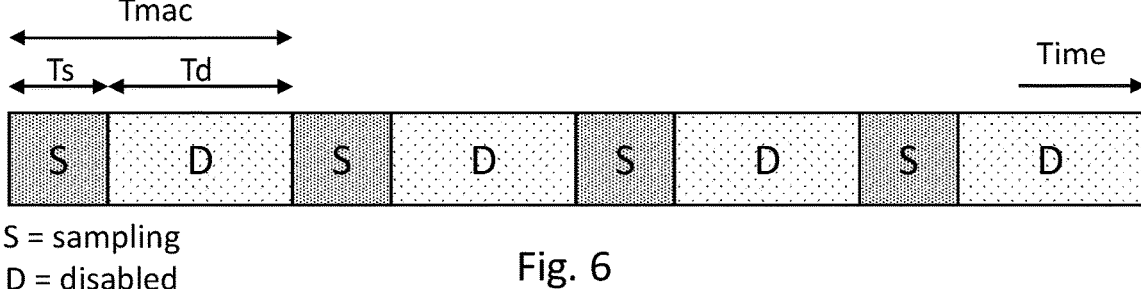
FIG. 6 is a timing diagram of a discontinuous sampling regime.

FIG. 6 is a timing diagram for a period of operation of the processing circuitry 404 in a discontinuous sampling mode. In the discontinuous mode, periods of sampling by the ADC 406 (sampling periods Ts) are interleaved by periods in which the ADC 406 is not sampling the voltage VO (non-sampling periods or disabled periods Td).

During non-sampling periods Td, the ADC 406 and/or any other component of the processing circuitry 404 may be disabled to save power. Disabling of the ADC 406 may comprise switching the ADC 406 off (e.g. by removing supplied power) or otherwise placing the ADC 406 in a low-power state. Alternatively, the 406 and/or other components of the processing circuitry 404 may be assigned to sampling/processing signals other than the voltage VO, such as signals obtained from one or more other electrodes of the cell 200 or of another cell (such as a battery cell).

During sampling periods Ts, the ADC 406 and other components of the processing circuitry 404 may be enabled for some or all of each sampling period Ts. For example, the ADC 406 and other components may be enabled during the entirety of each sampling period Ts, thereby maximizing sampling and processing performance to the detriment of power consumption. Alternatively, the ADC 406 and/or other components of the processing circuitry 404 may be enabled only for a portion of the sampling periods Ts and disabled for the rest of each sampling period Ts, leading to a comparative reduction in power consumption to the detriment of sampling and processing performance.

Examples of such sampling regimes are described in more detail below, in which the combined time period Tmac spanning one sampling period Ts and one non-sampling period Td is referred to as a macro period Tmac.

The processing circuitry 404 may operate in one or more variants of the discontinuous sampling mode, including but not limited to a macro sampling mode, a micro sampling mode, and a hybrid sampling mode (in which the processing circuitry is operating simultaneously in the macro and micro sampling modes).

Figure 7:
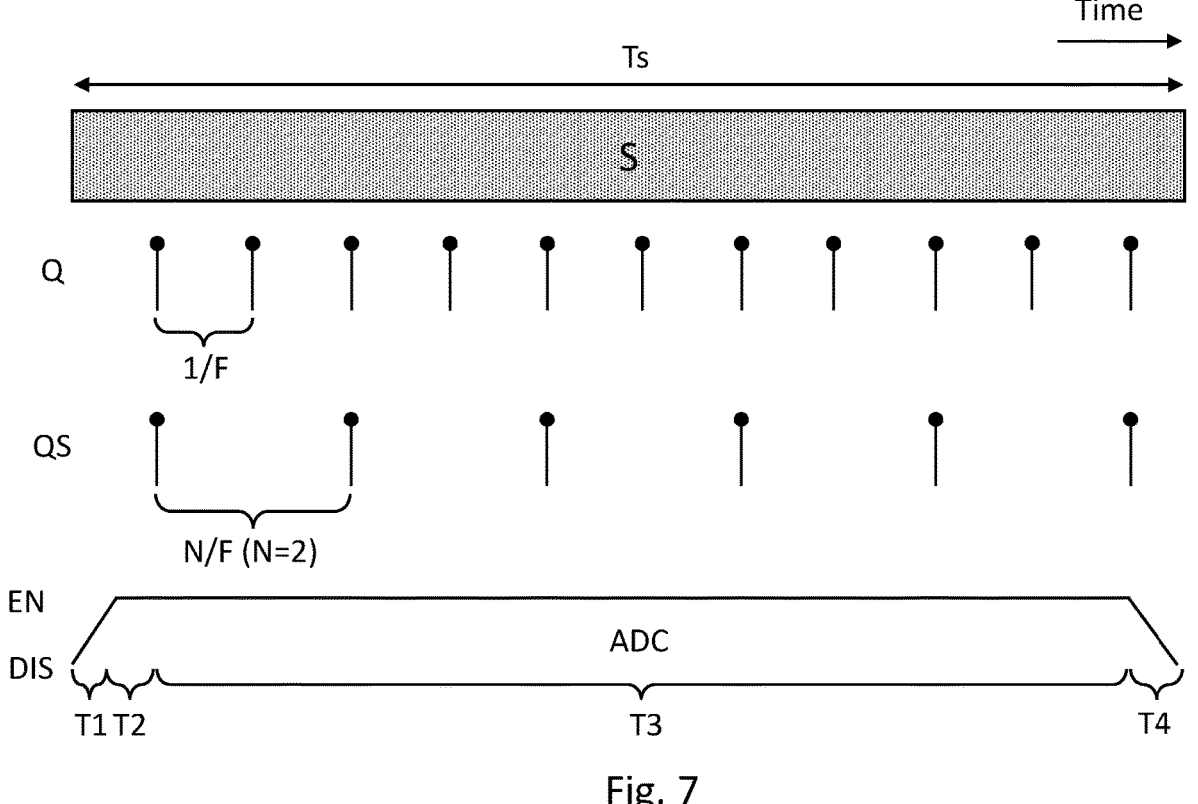
FIG. 7 is a timing diagram of an example macro sampling regime.

FIG. 7 is a timing diagram of input and output signals Q, QS from the processing circuitry 404 over a single sampling period Ts, and ADC status of the ADC 406.

At commencement of the sampling period Ts, the control circuitry 410 enables the ADC 406. Like all ADCs, the ADC 406 may have inherent startup and settling times. Accordingly, the ADC 406 may start up over a start-up period T1. The start-up period T1 may be followed by a settling period T2 in which transients in the ADC 406 settle. It will be appreciated that other components of the processing circuitry 404, such as filters implemented in the downsampling circuitry 408, may also have start up and settling times. Accordingly, the settling period T2 may be associated with the total settling time required for all components of the processing circuitry 404 to be in an operational state to accurately process measurements of the output VO.

After the settling period T2, the first valid sample may be output from the ADC 406. The ADC 406 proceeds with sampling the output VO, as shown in the digital output signal Q, over a time period T3. In this example, the downsampling circuitry 408 is set to downsample by a factor N=2.

At the end of the sampling period Ts, the control circuitry 410 may disable the ADC 406 and the ADC 406 may shut down over a shutdown period T4.

In some embodiments, the startup and shutdown periods T1, T4 may be in the order of 3 ms (dependent on analogue and digital sequencing). The settling time T2 may be significantly longer than the startup and shutdown periods, for example in the order of 38 ms (dependent on filter choice).

In cases where the ADC 406 and/or other components of the processing circuitry 404 are assigned to other sampling/processing tasks during the non-sampling period Td, the control circuitry 410 may be configured to control such reassignment, such as by controlling one or more switches or multiplexers (not shown) and/or routing one or more additional signals to be processed to the ADC 406 and/or downsampling circuitry 408. In which case, the startup and shutdown periods T1, T4 may not be present, and the settling period T2 may be due to transients associated with switching in/out various components of the processing circuitry 404.

As with the continuous mode, the downsampling factor N may be adjusted or adapted by the control circuitry 410, depending on one or more parameters described above, and in more detail below.

In this purely macro mode, the ADC 406 is enabled for the duration of the sampling period Ts. The inventors have realised however, that the sampling period Ts can be further structured to duty cycle enablement of the ADC 406 during the sampling period Ts, thereby decreasing power consumption of the ADC 406 and associated circuitry during the sampling period Ts. Such a process is referred to below as micro sampling.

Figure 8:
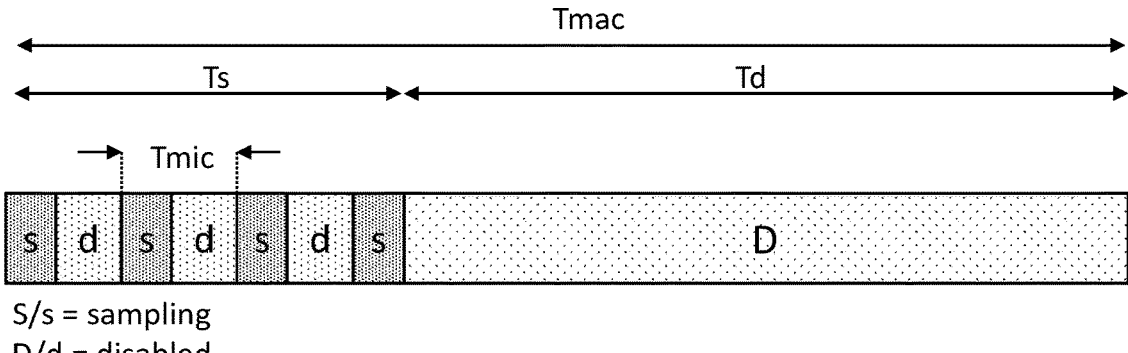
FIG. 8 is a timing diagram of an example hybrid sampling regime.

FIG. 8 is a timing diagram of an example hybrid sampling mode in which the processing circuitry 404 implements micro sampling during the sampling period Ts in addition to the aforementioned macro sampling or macro duty cycling.

Within each sampling period Ts, the processing circuitry 404 is configured to switch between sampling (during micro-sampling periods s) and non-sampling (during micro non-sampling periods d). The total time taken to cycle through one micro-sampling period s and one micro non-sampling period d is referred to herein as a micro period Tmic.

Figure 9:
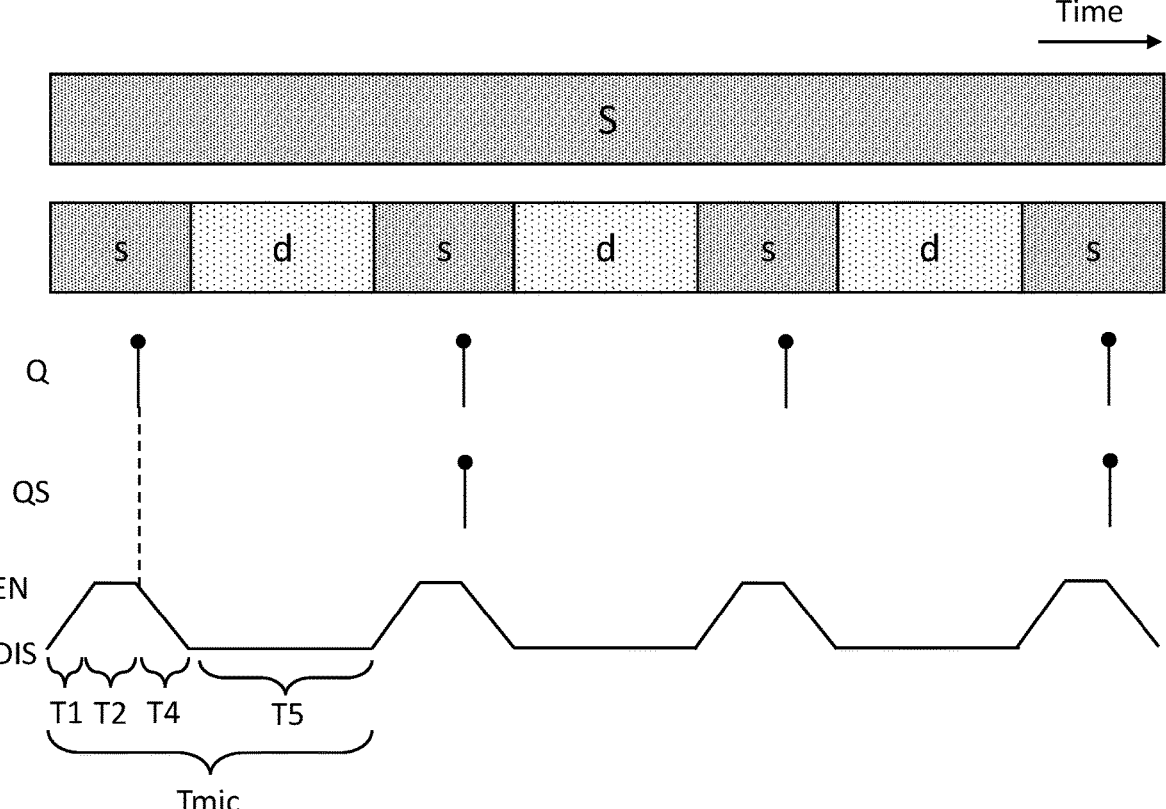
FIGS. 9 and 10 are timing diagrams of example micro sampling regimes.

FIG. 9 is a timing diagram of an example sampling micro sampling regime, showing the digital output Q from the ADC 406 and the downsampled digital output signal QS alongside the ADC status (similar to that shown in FIG. 7).

At the commencement of the first micro-sampling period s (falling within the macro sampling period S), the control circuitry 410 enables the ADC 406 which enters into start-up and settling processes described with reference to FIG. 7 (T1 and T2). After the settling period T2, the ADC 406 samples the output VO to obtain the digital output signal Q which is provided to the downsampling circuitry 408. Like the previous cases, the downsampling factor is also N=2 in this example.

As soon as the ADC 406 has output a sample, the control circuitry 410 disables the ADC 406 which shuts down during a shutdown period T4. The processing circuitry 404 then enters the micro-non-sampling period d in which the ADC 406 (and/or other processing circuitry is disabled). During this period, no sampling takes place, thus saving power.

In cases where the ADC 406 and/or other components of the processing circuitry 404 are assigned to other sampling/processing tasks during micro non-sampling periods d, the control circuitry 410 may be configured to control such reassignment, such as by controlling one or more switches or multiplexers (not shown) and/or routing one or more additional signals to be processed to the ADC 406 and/or downsampling circuitry 408. In which case, the startup and shutdown periods T1, T4 may not be present, and the settling period T2 may be required to accommodate transients associated with switching in/out various components of the processing circuitry 404.

Steps recited above are repeated at commencement of the next micro-sampling period s until the end of the (macro) sampling period Ts. Preferably, the micro non-sampling period d is set such that the total time between samples output from the ADC 406 is an integer multiple of the native sampling period 1/F of the ADC.

In this example, the processing circuitry 404 operates in both a micro sampling mode during the sampling period Ts, and an macro sampling mode over the macro period Tmac. Reducing the time during which the ADC 406 is enabled reduces power consumption.

Additionally, for the same number of samples, distributing sampling substantially evenly over time can give better rejection of high impulse noise. For example, consider a scenario in which the processing circuitry 404 was operated in the continuous sampling mode for 10 seconds during which it obtained 100 samples, and was then disabled for 20 seconds. If the processing circuitry 404 was subject to a burst of high impulse noise during the 10 seconds of sampling, such noise would introduce a larger error than if the same number of samples were gathered over the entire 30 seconds in the discontinuous mode. High impulse noise is particularly prevalent in situations where the system 400 is integrated into a wearable device. In such situations, (high impulse) body noise associated with a subject wearing the wearable device may be prevalent.

Thus, the discontinuous control scheme described herein offers the opportunity to obtain an optimum trade-off between power efficiency and resilience to noise (both Gaussian and impulsive) for a given application or use case.

In the example shown in FIG. 8, the ADC 406 is disabled after one sample. In other embodiments, the ADC 406 may remain enabled for more than one sample. Additionally or alternatively, the ratio of micro-sampling period s to micro-non-sampling period d may be increased.

Figure 10:
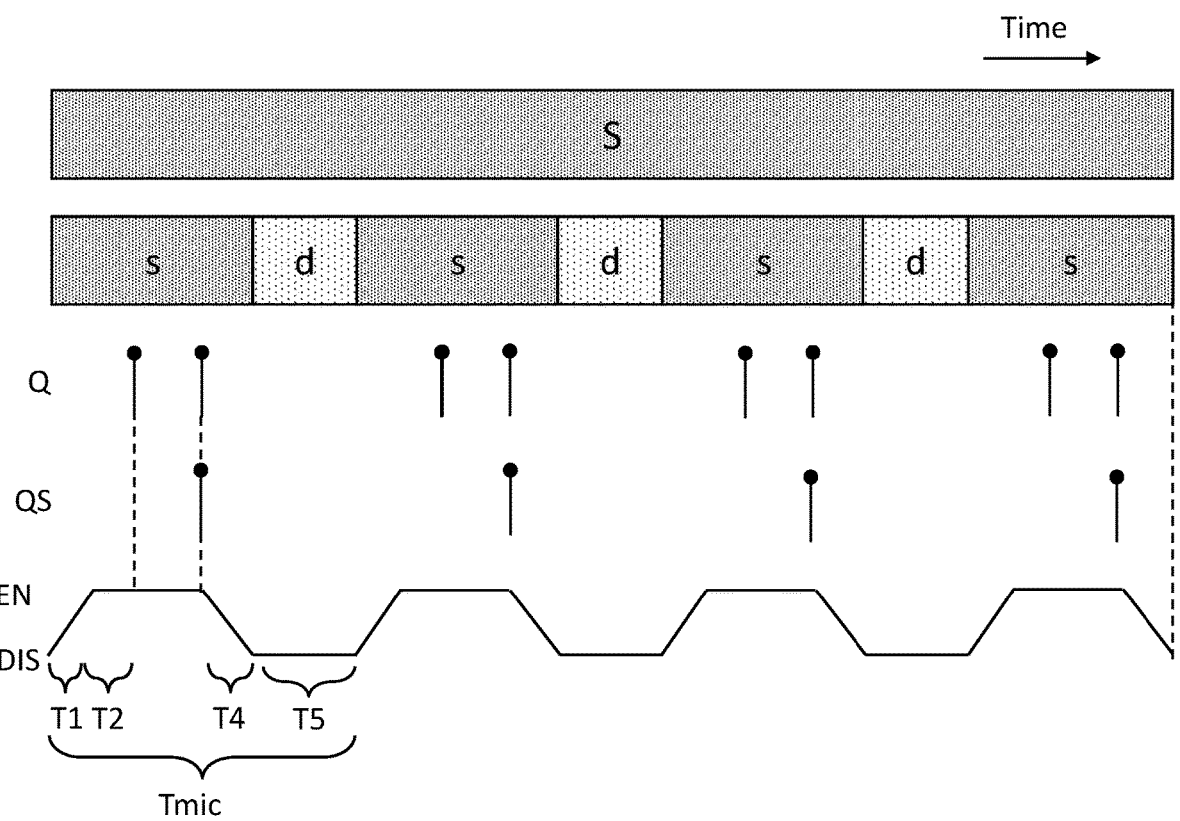

FIG. 10 is a timing diagram of a variation of the micro sampling regime shown in FIG. 9. In this example, the ADC 406 is enabled for two samples before being disabled. As such, the micro-sampling period s is longer and the micro-non-sampling period d shorter.

It will be appreciated that for certain sensing applications, such as potentiostatic sensing, various components of circuitry used for measurement and processing may be sensitive to real world interference from electronic signals with a wide range of frequencies, such as those emanating from consumer devices. For example, many electronic devices use fixed frequency signals for timing purposes (e.g. clocks, crystals etc.). Low power, high impedance measurement circuitry can be particularly susceptible to interference from such signals.

In the examples described with reference to FIGS. 6 to 10, sampling is performed periodically, since all of the (macro) non-sampling periods Td are equal to one another, and all of the (micro) non-sampling periods d are equal to one another. To address potential interference due to external noise at fixed frequencies, anti-aliasing may be performed in downstream processing of the downsampled digital output signal QS. However, since the digital output signal QS is unknown during periods in which the signal path is disabled, e.g. when the ADC 406 is disabled, anti-aliasing may not be sufficiently effective in reducing interference noise. For example, where the frequency of interfering noise becomes coherent with the macro or micro periods Tmac, Tmic of sampling by the processing circuitry 404, this could significantly affect the signal error.

A solution to this problem is to implement a stochastic sampling approach. To do so, the delay between macro sampling periods and/or micro sampling periods may be randomised, reducing the likelihood that sensitive interfering frequencies become coherent with the sampling scheme for detrimentally long periods of time. The effect of such a regime may be that, over multiple macro and micro samples used, the interfering frequency will be averaged out and reduced to a much smaller error component. Stochastic sampling may reduce the sensitivity of periodic macro/micro duty cycling to interfering frequencies that are often found in real world environments.

Figure 11:
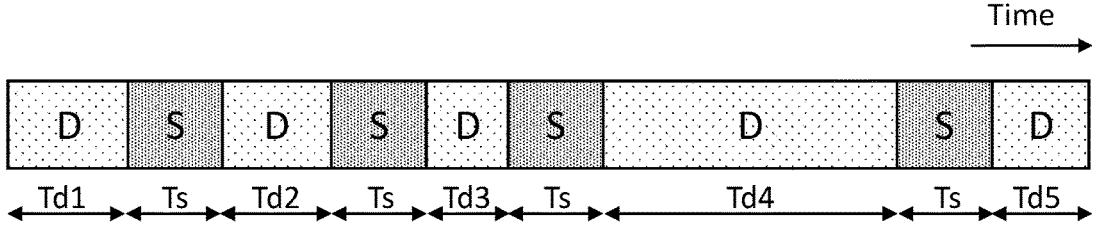
FIG. 11 is a timing diagram of a stochastic discontinuous sampling regime.

FIG. 11 is a timing diagram of an example stochastic discontinuous sampling mode which can be compared to the non-stochastic discontinuous sampling mode FIG. 6. It can be seen that all of the sampling periods Ts are equal. However, instead of having a fixed non-sampling period Td, the non-sampling period Td is randomised over the duration of sampling. The control circuitry 410 is configured to implement such randomization such that the average number of samples over time remains substantially fixed. In other words:

$$Td1 + Td2 + Td3 + Td4 + Td5 \approx 5(Td).$$

It will be appreciated that stochastic sampling as described above may be performed at the macro level, or the micro level or both the macro and micro levels. In other words, the duration of period Td may be randomised, or the duration of the micro-period d may be randomised, or both.

It will also be appreciated that whilst the durations of non-sampling periods are described above as being randomised, a similar effect may be achieved using pseudo-randomisation, or by varying the duration of successive non-sampling periods in a suitable long term pattern.

Figure 12:
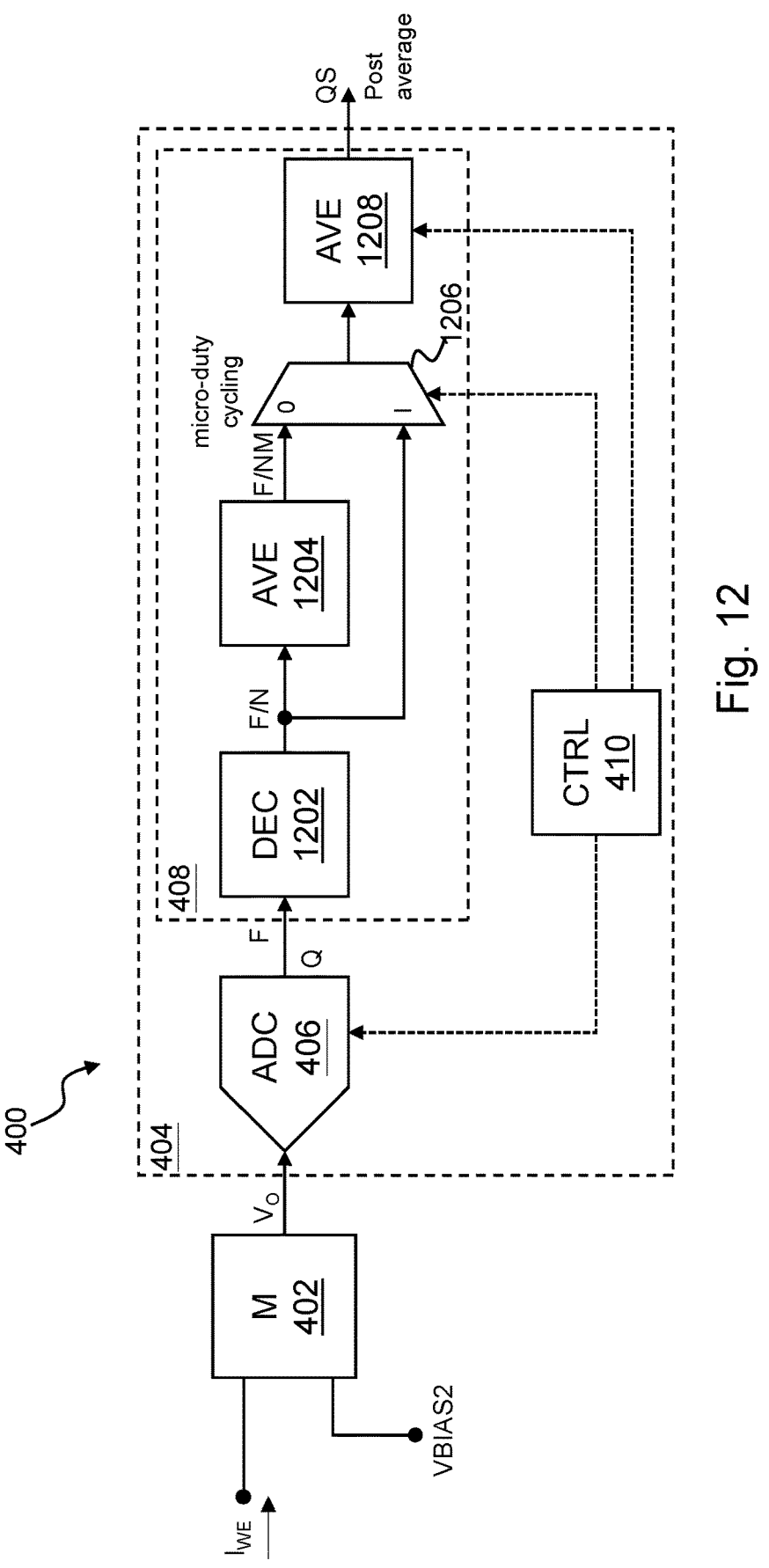
FIG. 12 is a schematic diagram of the adaptive processing system of FIG. 4, showing an example implementation of downsampling circuitry.

FIG. 12 is a schematic diagram of the system 400 showing an example implementation of the downsampling circuitry 408.

In this example, the downsampling circuitry 408 comprises a decimator 1202, a first averaging circuit 1204, a multiplexer 1206, and a second averaging filter 1208.

As noted above, the ADC 406 is configured to sample the output voltage VO at an ADC sampling rate F to output a digital output signal Q at the ADC sampling rate F. In one example, the ADC 406 operates at a sampling rate F of 32.768 KHz.

The digital output signal Q is provided to the decimator 1202 which is configured to downsample the digital output signal Q by a factor N to generate an intermediate digital output QN having a downsampled frequency F/N. The decimator 1202 may comprise a low-pass finite impulse response (FIR) filter, such as a cascaded integrator-comb (CIC) filter. The decimator 1202 may further comprise a notch filter (or other suitable filter) configured to filter out interference from mains power, for example at 50 to 60 Hz. In one example, where the ADC 406 operates at a sampling rate F of 32.768 kHz, the decimator 1202 may be configured to decimate by 596 (i.e. N=596), giving a downsampled frequency F/N of 55 Hz for the intermediate digital output QN.

The intermediate digital output QN is provided at a first input of the multiplexer 1206 and to a first averaging circuit 1204.

The first averaging circuit 408 may comprise a rolling average filter. The first averaging circuit 408 may be configured to decimate the intermediate digital output QN by a factor M. Thus, the first averaging circuit 408 may output a macro signal having a sample frequency of F/NM.

The multiplexer 1206 is controlled by the control circuitry 410 to select between outputting the macro signal and the micro signal (i.e. the output of the decimator 1202 and the output of the first average filter 1204). In doing so, the control circuitry 410 can select between different sampling rates for downstream processing.

Optionally, the second average filter 1208 is provided to further downsample the signal output from the multiplexer 1206 to output the downsampled digital output signal QS.

It will be appreciated that the first and second average filter 1204, 1208 may need knowledge of how many samples are being averaged for each output sample so as to perform effectively.

Figure 13:
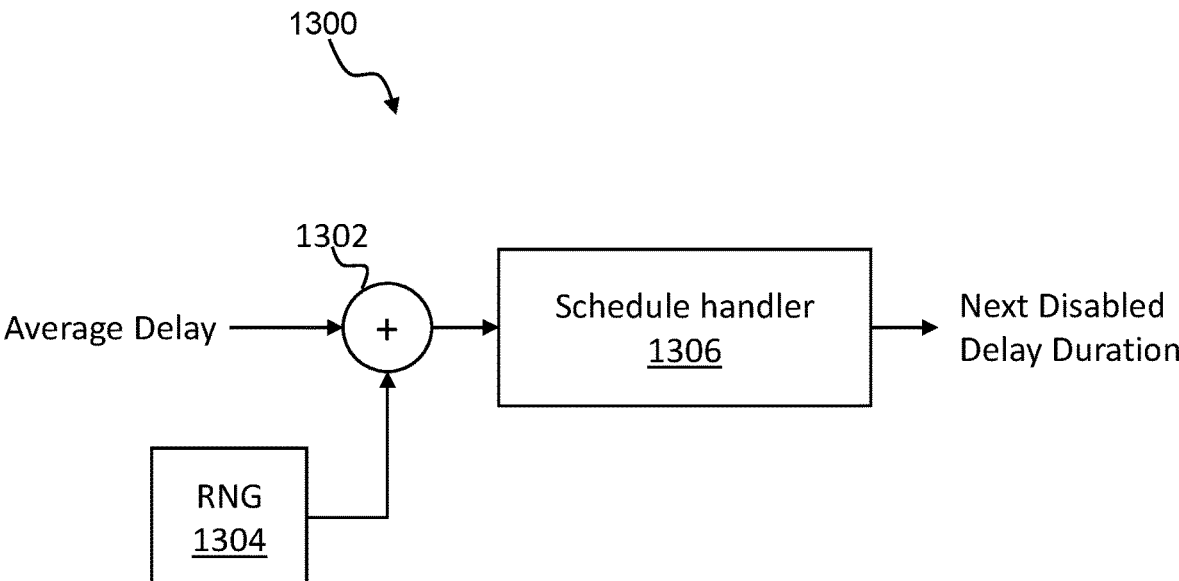
FIG. 13 is a schematic diagram of circuitry for calculating randomized delay for stochastic sampling.

FIG. 13 is a block diagram of an example circuit 1300 for calculating randomised delay for stochastic sampling. The circuit 1300 may be implemented by the control circuitry 410. The circuit 1300 comprises an adder 1302, a random number generator (RNG) 1304 and a schedule handler 1306. The RNG 1304 may be implemented using a linear feedback shift register (LFSR). The RNG 1304 generates a random number which is added to a required average (longer term) delay by the adder 1302. The result is provided to the schedule handler 1306 which implements a control regime to control the various components of the processing circuitry 404 to implement the requisite non-sampling period Td/d. The schedule handler 1306 may ensure that the delay cannot go below zero or above a maximum allowable delay as well as keeping the overall number of samples across a longer time frame equal to the corresponding average delay.

As noted above, by a) switching between sampling modes, and b) adapting characteristics of the various sampling modes, a trade-off can be achieved between power consumption and circuit performance.

Adaptation may comprise one or more of the following: switching between continuous and discontinuous sampling modes; adjusting the number of samples obtained during one or more macro periods Tmac or micro periods Tmic; adjusting the duration of a macro period Tmac or micro period Tmic (including a duty cycle ratio), and adjusting the quantity and techniques used to downsample signals output from the ADC 406.

Adaptation of sampling may be dependent on one or more factors. For example, the processing circuitry 404 may be configured to adapt sampling in dependence on a performance metric associated with one or more components of the system 400. Such performance metrics may include a noise level (e.g. in the measurement circuit 402 or the processing circuitry 404), or a level of aliasing in the samples obtained.

In some embodiments, adaptation of sampling may be dependent on a power characteristic associated with the system 400. For example, where the system 400 is powered by a battery, the power characteristics may comprise a battery power level of the battery. In some embodiments, sampling may be adapted in response to a determination that power characteristics is falling outside of a predetermined range. Sampling may be adapted in such circumstances to decrease power consumption.

In some embodiments, adaptation of sampling may be dependent on the particular analyte being measured in the cell 200. For example, an optimum sampling regime for glucose as an analyte may be different to a sampling regime for ketones.

In some embodiments, the processing circuitry 404 may be configured to adapt sampling based on the measured response of the cell. For example, when the cell 200 is measuring glucose concentration, the processing circuitry 404 may be configured to increase the accuracy of measurement of glucose levels at the detriment of power consumption. This adaptation may be performed specifically when analyte levels are approaching or exceeding one or more threshold levels, such as those that may present a risk to the subject being measured.

Embodiments are described above with reference to cells 100, 200 comprising a single counter electrode CE and a single working electrode WE. Embodiments of the disclosure are not, however, limited to having cells having only one counter electrode or only one working electrode. The concepts described herein are equally applicable to cells comprising multiple working electrodes or multiple counter electrodes. In doing so, such sensors may either be providing redundancy or enabling the sensing of multiple analytes in a single chip. This may be particularly advantageous in applications such as continuous glucose monitoring, where it may be desirable to measure concentrations of several analytes including but not limited to two or more of glucose, ketones, oxygen, lactate, and the like.

Figure 14:
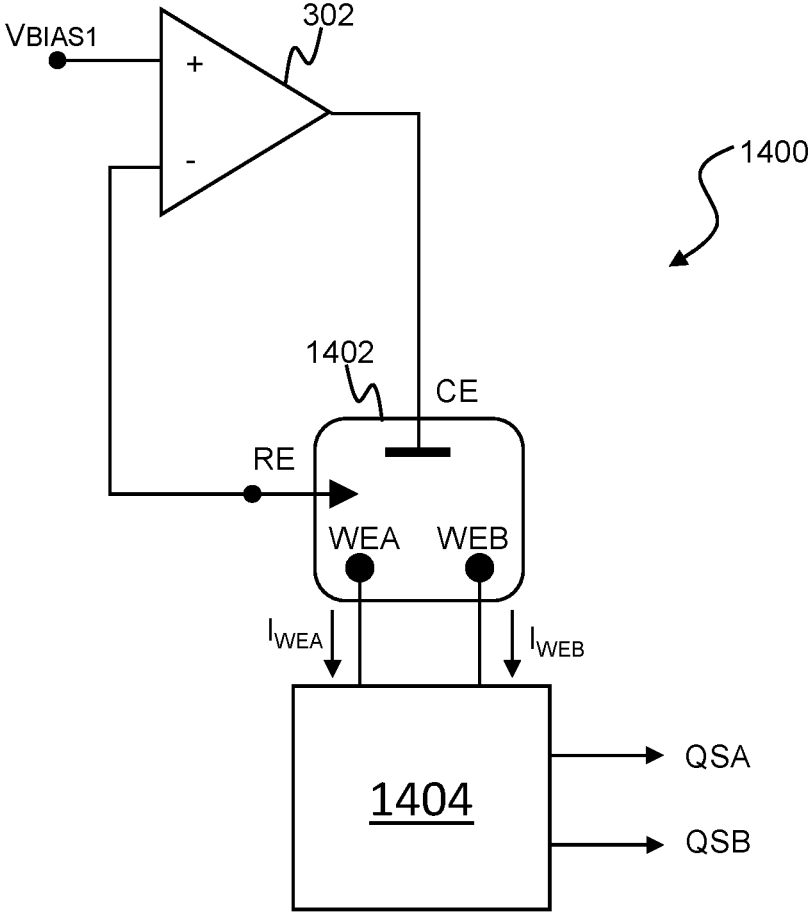
FIG. 14 is a schematic diagram of an example measurement circuit for a multi-working-electrode electrochemical cell.

FIG. 14 illustrates an example drive and measurement circuit 1400. Where like parts have been given like numbering. In the circuit 1400, an electrochemical cell 1402 comprising first and second working electrode WEA, WEB, a counter electrode CE, and a reference electrode RE. A measurement circuit 1404 is provided which outputs a first digital output signals QSA based on a current IWEA derived from the first working electrode WEA and outputs a second digital output signal QSB based on a current IWEB derived from the second working electrode WEB. The measurement circuit 1404 may, for example, comprise two processing channels, each processing channel implementing the circuitry shown in FIG. 4. Alternatively, the measurement circuit 1404 may be implemented using a single processing stream multiplexed by a multiplexer (not shown). In either case, the measurement circuit 1404 may be operable to hold the first and second working electrodes WEA, WEB at different voltages. This may be particularly useful when measuring different analytes with the first and second working electrodes WEA, WEB.

In the embodiments described herein, the electrochemical cell 100 has been described in the form of an electrochemical sensor comprising counter and working electrodes CE, WE (and optionally a reference electrode RE). For such sensors, the stimulus is typically a voltage, and the measured response is a current. It will be appreciated that embodiments of the present disclosure are not limited to such cells and extend to other types of cells, such as electrochemical cells acting as a power source (i.e. a battery) and potentiometric sensors (such as an ion selective electrolyte (ISE) sensor (e.g. a pH meter)). For batteries, potentiometric sensors and the like, the driving stimulus of the cell is typically a current, and the measured response a voltage. Embodiments described above in relation to the amperometric electrochemical cell 100 can equally be applied to cells which are driven with a current, instead of a voltage and for which voltage is the response being measured.

The various circuitry and electrochemical cells described herein may be incorporated into a continuous analyte sensor or a continuous glucose sensor or a continuous glucose monitor. The terms "continuous analyte sensor", "continuous glucose sensor", and "continuous glucose monitor" as used herein, will be well-known to a person of ordinary skill in the art and are not to be limited to a special or customized meaning. These terms refer, without limitation, to a device that continuously measures a concentration of an analyte/glucose and/or calibrates the sensor or an electrochemical cell incorporated therein (e.g., by continuously adjusting or determining the sensor's sensitivity and background).

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high-speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general-purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. Circuitry for processing a response from an electro-chemical cell to a stimulus, the circuitry comprising:
   sense circuitry configured to measure the response of the electrochemical cell to the stimulus; and
   processing circuitry configured to:
      sample the measured response to obtain a plurality of samples; and
      output the plurality of samples,
   wherein the processing circuitry is operable in:
      a continuous sampling mode in which the processing circuitry is configured to periodically sample the measured response at a fixed sampling rate;
      a discontinuous sampling mode in which the processing circuitry is configured to periodically sample the measured response during macro periods separated by macro intervals during which sampling of the measured response is disabled.

2. Circuitry of claim 1, wherein the number of samples obtained during each macro period is one.

3. Circuitry of claim 1, wherein during each macro period, the processing circuitry is configured to periodically sample the measured response during micro periods separated by micro intervals in which sampling of the measured response is disabled.

4. Circuitry of claim 1, wherein the processing circuitry is continuously enabled in the continuous sampling mode.

5. Circuitry of claim 1, further comprising:
   drive circuitry configured to apply the stimulus to the electrochemical cell.

6. Circuitry of claim 1, wherein the electrochemical cell comprises one of an amperometric sensor, a potentiometric sensor and a battery.

7. An integrated circuit (IC), comprising the circuitry of claim 1.

8. A system comprising:
   the circuitry of claim 1; and
   the electrochemical cell.

9. Circuitry of claim 1, wherein the processing circuitry is configured to adapt sampling of the measured response over time.

10. Circuitry of claim 9, wherein adapting sampling of the measured response comprises:

stochastically sampling the measured response by randomizing a duration of each of the micro/macro intervals.

11. Circuitry of claim 9, wherein adapting sampling of the measured response comprises one or more of the following:
   a. switching between the continuous sampling mode and the discontinuous sampling mode;
   b. adjusting a number of samples obtained during the macro period;
   c. adjusting a duration of the macro period;
   d. adjusting a duration of the macro interval.

12. Circuitry of claim 11, wherein the duration of each macro interval is pseudo-randomly generated.

13. Circuitry of claim 9, wherein the processing circuitry is configured to adapt sampling in dependence on one or more of the following:
   a performance metric associated with the circuitry;
   a power characteristic of the circuitry; and
   an analyte of interest present in the electrochemical cell.

14. Circuitry of claim 13, wherein the performance metric comprises one or more of the following:
   a. a noise level in the sense circuitry or the processing circuitry;
   b. a level of aliasing in the plurality of samples.

15. Circuitry of claim 13, wherein the power characteristic comprises a battery power level of a battery providing power to the circuitry, wherein the processing circuitry is configured to adapt sampling of the measured response to consume less power in response to the power characteristic of falling below a power threshold.

16. Circuitry of claim 13, wherein the processing circuitry is configured to adapt sampling of the measured response in dependence on a determined analyte concentration in the electrochemical cell.

17. Circuitry of claim 1, wherein the processing circuitry comprises a first analog-to-digital converter (ADC) configured to perform the sampling.

18. Circuitry of claim 17, wherein:
   the electrochemical cell comprises a first electrode and a second electrode;
   the sense circuitry is configured to measure the response of the electrochemical cell to the stimulus at the first electrode, and to measure a second response of the electrochemical cell to the stimulus at the second electrode; and
   the processing circuitry comprises an additional ADC configured to sample the measured second response to obtain an additional plurality of samples.

19. Circuitry of claim 18, wherein:
   the processing circuitry is configured to control sampling by the ADC and the additional ADC, wherein controlling sampling by the ADC and the additional ADC comprises synchronising sampling by the ADC and the additional ADC.

20. Circuitry of claim 1, wherein the measured response is obtained from a first electrode of the electrochemical cell, wherein during the macro intervals, one or more components of the processing circuitry are configured to process one or more additional signals.

21. Circuitry of claim 20, wherein the one or more additional signals comprises one of:
   an additional measured response obtained from a second electrode of the electrochemical cell;
   a signal obtained from a battery, the battery powering the circuitry.

22. An electronic device, comprising the circuitry of claim 1.

23. The electronic device of claim 22, wherein the device comprises one of an analyte monitoring device, an analyte sensing device, a battery, a battery monitoring device, a mobile computing device, a laptop computer, a tablet computer, a games console, a remote control device, a home automation controller or a domestic appliance, a toy, a robot, an audio player, a video player, or a mobile telephone, and a smartphone.

24. A method of processing a response from an electrochemical cell to a stimulus, the method comprising:

measuring the response of the electrochemical cell to the stimulus; and sampling the measured response to obtain a plurality of samples; and outputting the plurality of samples;

wherein sampling of the measured response is performed in:

a continuous sampling mode in which the measured response is sampled periodically at a fixed sampling rate; and a discontinuous sampling mode in which the measured response is sampled periodically during macro periods separated by macro intervals during which sampling of the measured response is disabled.

* * * * *